US006487613B1

United States Patent
Nguyen et al.

(10) Patent No.: US 6,487,613 B1
(45) Date of Patent: Nov. 26, 2002

(54) SYSTEM FOR INDICATING CHANNEL AVAILABILITY BY HAVING A LIGHT EMITTING DIODE OPERATIVE TO SIGNAL OF CONNECTION OF A DATA STORAGE DEVICE TO AN INTERNAL CONNECTOR

(75) Inventors: Truc M. Nguyen, Round Rock, TX (US); Jenwei Hsieh, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 09/418,070

(22) Filed: Oct. 14, 1999

(51) Int. Cl.[7] .................................................. G06F 3/00
(52) U.S. Cl. ........................ 710/15; 710/17; 710/62; 710/74
(58) Field of Search .......................... 710/2, 15, 16, 710/17, 62, 74, 104, 300, 301, 72; 711/111, 114; 326/30; 709/201–203; 340/687

(56) References Cited

U.S. PATENT DOCUMENTS

| 5,345,565 | A | | 9/1994 | Jibbe et al. ................ 395/325 |
|---|---|---|---|---|
| 5,377,357 | A | * | 12/1994 | Nishigaki et al. .......... 710/303 |
| 5,467,453 | A | | 11/1995 | Kocis .......................... 395/281 |
| 5,613,074 | A | * | 3/1997 | Galloway ...................... 326/30 |
| 5,613,873 | A | | 3/1997 | Bell, Jr. ........................ 439/490 |
| 5,628,637 | A | | 5/1997 | Pecone et al. ................. 439/74 |
| 5,680,555 | A | * | 10/1997 | Bodo et al. ..................... 710/2 |
| 5,734,208 | A | | 3/1998 | Jones .......................... 307/139 |
| 5,754,112 | A | * | 5/1998 | Novak ......................... 340/332 |
| 5,928,327 | A | * | 7/1999 | Wang et al. ................. 709/219 |
| 6,064,566 | A | * | 5/2000 | Agata et al. ................. 361/684 |
| 6,070,206 | A | * | 5/2000 | Lohmeyer et al. ............ 710/2 |
| 6,108,740 | A | * | 8/2000 | Caldwell ...................... 326/30 |

* cited by examiner

Primary Examiner—Jeffrey Gaffin
Assistant Examiner—Ilwoo Park
(74) Attorney, Agent, or Firm—Baker Botts L.L.P.

(57) ABSTRACT

A system and method for indicating the availability of a controller channel are disclosed. A system incorporating teachings of the present disclosure may include a controller operable to manage an array of data storage devices. The devices may include, for example, disk drives with both read and write functionality. Preferably, the controller will have at least one channel, which may have both an internal and an external connector. The system may also include an indicator operable to indicate when a data storage device is attached to an internal connector of a given channel. As such, employing teachings of the present disclosure may allow a user to accurately and expeditiously determine whether a given controller channel is available.

19 Claims, 2 Drawing Sheets

SYSTEM FOR INDICATING CHANNEL AVAILABILITY BY HAVING A LIGHT EMITTING DIODE OPERATIVE TO SIGNAL OF CONNECTION OF A DATA STORAGE DEVICE TO AN INTERNAL CONNECTOR

TECHNICAL FIELD OF THE INVENTION

This invention relates in general to the field of computer systems, and more particularly to a system and method for indicating the availability of a RAID controller channel.

BACKGROUND OF THE INVENTION

In recent years, data intensive applications have grown more common and have made storing vast amounts of data in an online format more important. For many of these applications, the medium storing the data needs to offer high degrees of security and reliability while remaining readily accessible to a number of different requesters.

While hard drives have proven to be the paragon of secure and readily accessible storage mediums, the storage demands created by many modern applications have become too great for a single hard drive to satisfy. To meet increased demands, many computing systems employ RAID technology. RAID ("Redundant Array of Independent (or Inexpensive) Disks") technology unites the capacity of several devices into a segment of common storage and, as such, introduces increased data reliability with improved data throughput capabilities. In operation, a typical RAID array has data distributed in stripes across multiple devices. This striping enables a RAID system to access data from the multiple devices at the same time.

RAID technology appears across the entire computing spectrum from personal computers to mainframes. Despite having a multiple device configuration, a RAID array may be viewed as a very large virtual device. Providing the backbone for the RAID array is a RAID controller. The RAID controller not only relays the input/output (I/O) commands to specific devices in the array, but it often provides the physical link to each of the independent devices.

Some conventional RAID controllers provide this physical link with channels that have a small computer system interface (SCSI) connector. SCSI connectors provide a standard interface that allows many different kinds of SCSI devices to be connected to the RAID controller. Occasionally, a RAID controller has an individual channel with more than one SCSI connector. For example, a RAID controller may have an internal SCSI connector and an external SCSI connector for the same channel.

By providing both an internal and an external SCSI connector, conventional RAID systems offer some degree of set up flexibility. For example, in a server, an internal connector may be used to connect an onboard hard drive to an onboard RAID controller or an add-in RAID controller. Alternatively, an external connector may be used to connect an external device to an onboard controller or an add-in RAID controller. Unfortunately, this added flexibility creates a number of operational difficulties, due to some limitations of typical SCSI busses. Generally, only 16 devices are allowed in a wide SCSI bus, and these devices have a unique SCSI ID. Moreover, termination is usually allowed only at the end of the physical bus. To enforce these limitations, typical RAID controllers are located at the end of the SCSI bus. In other words, if the internal connector of a RAID channel is already connected to an onboard device, the external connector for that channel is usually considered unavailable and should not, in typical RAID systems, be connected to an additional device.

As such, before a user connects a device to an external connector of a RAID system, the user will often identify a connector to be used and determine if that connector's channel is available—the channel is not already connected to a device via an internal connector. Conventional processes for determining channel availability are often cumbersome and time consuming. For example, in a rack mounted server application, a user may need to power down the server, remove the server from the rack, remove a portion of the server's housing, and visually determine if an internal SCSI connector is being used.

SUMMARY OF THE INVENTION

In accordance with teachings of the present invention, a system and method for indicating channel availability are disclosed that provide significant advantages over prior developed technologies. The disclosed embodiments allow a user to accurately and expeditiously determine whether a given RAID controller channel is available.

According to one aspect of the present disclosure, a computing system may include a controller operable to manage an array of data storage devices. The devices may include, for example, disk drives with both read and write functionality. Preferably, the controller will have at least one channel, which may have both an internal and an external connector. In a preferred embodiment, the controller will be a RAID controller with multiple channels. The computing system may also include an indicator operable to indicate when a data storage device is attached to an internal connector of a given channel. The indicator may indicate attachment in any number of ways. For example, the indicator may indicate attachment with a light, a sound or some mechanical movement.

In one embodiment, the computing system may also include a test circuit. This test circuit may be conductively coupled to; the internal connector of a channel; the indicator for that channel; and a power source. The internal connector may be a SCSI connector such as a wide SCSI connector with sixty-eight pins. Preferably, the test circuit will be coupled to a specific pin of the connector. For example, the test circuit may be connected to the twentieth pin of a wide SCSI connector. In one embodiment, the specific pin may be one designated as a pin to ground by a connector protocol. A pin to ground is one that is grounded when a device is coupled to the connector and is open when no device is coupled to the connector.

In operation, the power source may cause a current to flow to the indicator only when the specific pin is grounded. As such, when a device is connected to the internal connector of a controller channel, current will flow to the indicator. If, for example, the indicator includes a light emitting diode (LED), the LED may only emit light when current flows to it or when the internal connector is connected to a device.

The disclosed embodiments will preferably allow for simplified identification of available controller channels and, as such, provide significant improvements over conventional systems. For example, the disclosed system and method may reduce or eliminate much of the labor intensive and time consuming aspects of conventional techniques for identifying available channels.

Additionally, the disclosed system and method may yield a more reliable determination of channel availability. Conventional techniques not only often require a user to visually inspect an internal connector to determine if a given channel is available, but they also require the user to know which internal connector to visually inspect. In many RAID systems, for example, there may be multiple channels. Each of these channels may have connector pairs including one external connector and one internal connector. A user seeking to connect a device to a channel at that channel's external connector may attempt to determine if the channel is available by visually inspecting the internal connector associated with the channel. Unfortunately, the user may not know which internal connector to inspect and, as a result, may visually inspect the wrong internal connector.

Other technical advantages will be apparent to those of ordinary skill in the art in view of the following specification, claims, and drawings.

BRIEF DESCRIPTION OF THE DRAWINGS

A more complete understanding of the present disclosure and advantages thereof may be acquired by referring to the following description taken in conjunction with the accompanying drawings, in which like reference numbers indicate like features, and wherein.

DETAILED DESCRIPTION

Figure 1:
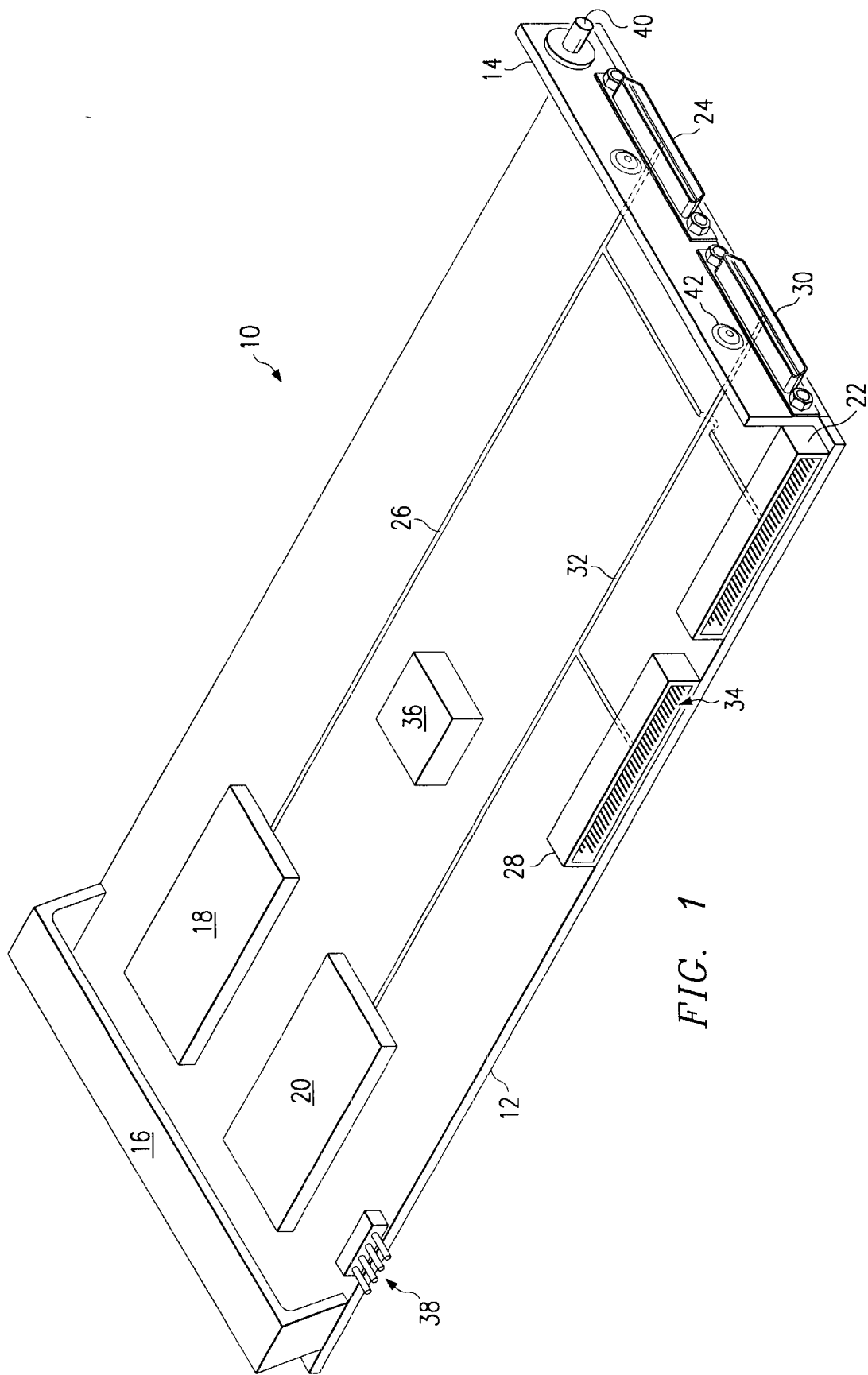
FIG. 1 is a schematic drawing showing an isometric view of a peripheral component card with elements of a RAID controller incorporating teachings of the present invention mounted thereon.
Figure 2A:
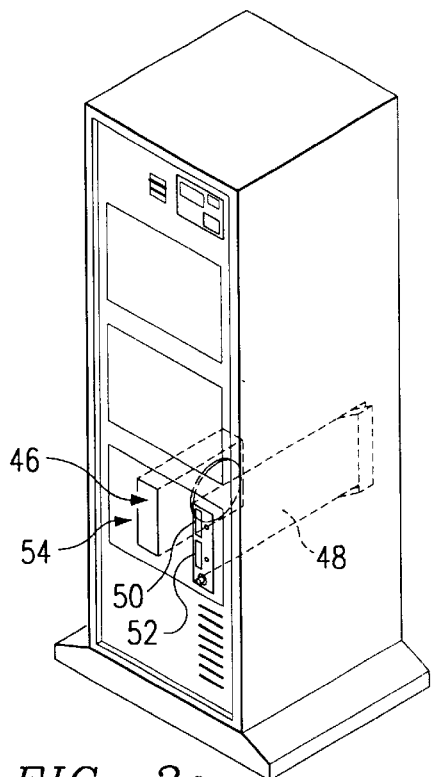
FIG. 2A is a schematic drawing showing an isometric view of a racked computer system with a local storage device and an installed RAID controller incorporating teachings of the present invention.
Figure 3:
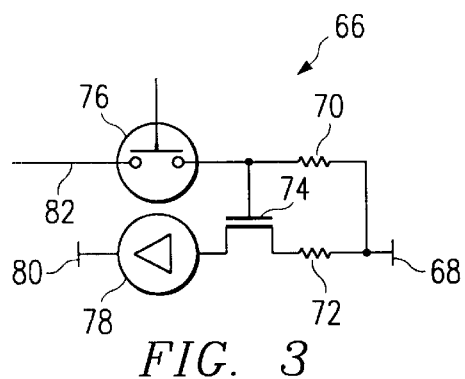
FIG. 3 is a schematic drawing of a test circuit incorporating teachings of the present invention for determining availability of a given RAID controller channel.

Preferred embodiments and their advantages are best understood by reference to FIGS. 1 through 3, wherein like numbers are used to indicate like and corresponding parts.

FIG. 1 depicts a peripheral component card 10 with elements of a RAID controller mounted thereon. Peripheral component card 10 may include a board 12, a mounting bracket 14, and a handle 16. In operation, peripheral component card 10 may be installed in a computing system such as a server or a workstation. When installed, handle 16 being locked may help maintain peripheral component card 10 in a desired location within the computing system. In preferred embodiments, mounting bracket 14 may remain visible to a user observing the computing system in which peripheral component card 10 may be installed.

As depicted, a pair of channel controllers 18 and 20 are mounted on peripheral component card 10. Channel controller 18 may be conductively coupled to both an internal connector 22 and an external connector 24. This connection consists of a bus or wirings between the controller 18 and its connectors, depicted as line 26. Channel controller 20 may be conductively coupled to both an internal connector 28 and an external connector 30. This connection consists of a bus or wirings between the controller 20 and its connectors, depicted as line 32. Lines 26 and 32 may relay input/output (I/O) commands from channel controllers 18 and 20, respectively, to data storage devices, like data storage device 46 depicted in FIGS. 2A and 2B. In addition, lines 26 and 32 may at least partially form a physical link coupling channel controllers 18 and 20 to individual data storage devices.

This physical link may also include internal connectors 22 and 28 or external connectors 24 and 30. In preferred embodiments, these connectors may be SCSI connectors such as wide SCSI connectors and have a plurality of pins such as pin 34. The pins of a connector may be operable to conductively couple with a SCSI plug and allow communication between channel controllers 18 and 20 and data storage devices coupled to the channel controllers.

In operation, channel controllers 18 and 20 may receive power from a local on-board battery such as battery 36. Channel controllers 18 and 20 may also have access to system power provided by a computing system in which peripheral component card 10 may be installed. Channel controllers 18 and 20 as well as other components located on peripheral component card 10 may communicate with a computing system in which peripheral component card 10 may be installed via communication link 38. Communication link 38 may also allow for the accessing of an additional power source.

In preferred embodiments, channel controllers 18 and 20 may be components of a RAID system. As depicted, channel controllers 18 and 20 each have an internal connector (22 and 28) and an external connector (24 and 30). In an embodiment where channel controller 20 makes up part of a RAID system and channel controller 20 has both an internal connector 28 and an external connector 30, a user seeking to couple a data storage device to external connector 30 may need to know whether or not internal connector 28 is already coupled to a data storage device. In other words, if internal connector 28 is already connected to a data storage device, external connector 30 may be considered unavailable and should not be used to connect channel controller 20 to an additional device.

Figure 2B:
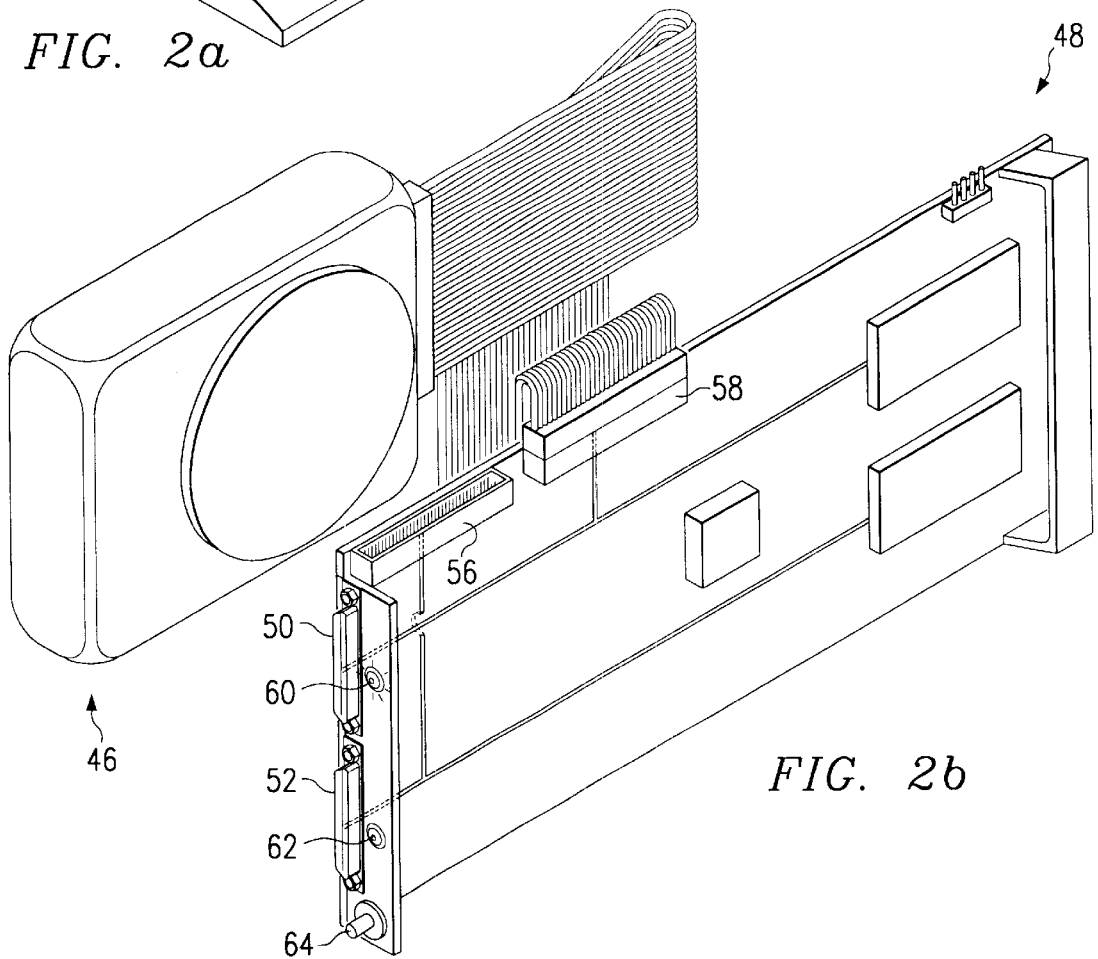
FIG. 2B is a schematic drawing showing an isometric view of a data storage device conductively coupled to a RAID controller that incorporates teachings of the present invention.

To help identify whether or not internal connector 28 is coupled to a data storage device such as data storage device 46 depicted in FIGS. 2A and 2B, push button 40 of FIG. 1 may be depressed. Push button 40 may be, for example, connected to a test circuit such as test circuit 66 shown in FIG. 3. In preferred embodiments, depressing push button 40 will result in the generation of a signal indicating whether or not a user should attach a data storage device to a given external connector such as external connector 24 or external connector 30. The signal may, for example, include the generation of a mechanical movement, a sound, or a light. A push button 64 may be implemented so that the test circuit does not consume power continously. In this embodiment, the test circuit may only be active as long as push button 64 is depressed. In a preferred embodiment, a light signal may be generated by a light emitting diode (LED) such as LED 42. Preferably, LED 42 will be made visible to a user on mounting bracket 14 even if peripheral component card 10 is installed within a computing system. One embodiment of a system wherein LED 42 would remain visible is depicted in FIGS. 2A and 2B.

FIGS. 2A and 2B show a portion of a rack 44 in which a computing system 54 is installed with a local storage device 46 and an installed RAID controller 48 that incorporates teachings of the present disclosure. In FIG. 2A, external connectors 50 and 52 are accessible to a user despite the fact that RAID controller 48 is installed within computing system 54 of rack 44. Conversely, internal connectors 56 and 58 (shown in FIG. 2B) may not be easily accessible to a user when RAID controller 48 is installed within computing system 54. In addition, internal connectors 56 and 58 (shown in FIG. 2B) may not be easily viewable to a user when RAID controller 48 is installed within computing system 54. As such, a user may not be able to easily determine that data storage device 46 is coupled to internal connector 58.

To help a user identify when internal connector 58 is in use, RAID controller 48 includes indicators 60 and 62. As depicted in FIG. 2B, indicators 60 and 62 include an LED. Connected to indicators 60 and 62 may be a test circuit such as test circuit 66 depicted in FIG. 3. In some embodiments, indicators 60 and 62 may continuously provide a signal indicating whether a given external connector is available, that is whether an internal connector coupled to the same channel as a given external connector is already coupled to a data storage device. In other embodiments, indicators 60 and 62 may only provide a signal when push button 64 is depressed.

As shown in FIG. 2B, internal connector 58 is coupled to data storage device 46, push button 64 has been depressed, and indicator 60 is signaling that external connector 50 is unavailable. Though several techniques could be employed for providing an availability signal, FIG. 3 depicts a preferred technique.

FIG. 3 depicts a schematic of a test circuit 66 incorporating teachings of the present disclosure for determining availability of a given RAID controller channel. As depicted, test circuit 66 includes a voltage source 68 a first resistor 70 and a second resistor 72. Voltage source 68 may, in some embodiments, include a voltage source remote from a given peripheral component card. In other embodiments, voltage source 68 may include a battery such as battery 36 shown in FIG. 1. By employing a battery, such as battery 36, test circuit 66 may be operable even if the computing system in which a given peripheral component card is installed is powered off.

In addition to power source 68 and resistors 70 and 72, test circuit 66 may include a transistor 74, push button 76, and an LED 78. In one embodiment, transistor 74 may be a P-FET transistor and push button wiring 74 may be connected to a push button such as push button 64 of FIG. 2B. Test circuit 66 may also include a ground 80 and pin wiring 82. In some embodiments, pin wiring 82 may be coupled to a specific pin of an internal connector, for example pin 34 of FIG. 1. In preferred embodiments, the specific pin, for example pin 34, will be identified as a pin to ground for the connector of which it is a part, for example internal connector 28 of FIG. 1. In such an embodiment, pin 34 will be grounded when internal connector 28 is coupled to a data storage device such as data storage device 46 of FIG. 2B. If pin 34 is grounded, pin wiring 82 will also be grounded. This fact allows test circuit 66, as depicted in FIG. 3, to indicate whether or not an internal connector is being used.

In the depicted embodiment of FIG. 3, when pin wiring 82 is not grounded, the closing of push button 76 does not turn transistor 74 on. Conversely, when pin wiring 82 is grounded, the closing of push button 76 will turn transistor 74 on, causing current to flow thorough LED 78. As current flows through LED 78, LED 78 lights providing a signal that indicates the channel being tested is unavailable.

Although the present invention has been described in detail, it should be understood that various changes, substitutions and alterations can be made thereto without departing from the spirit and scope of the invention as defined by the appended claims.

What is claimed is:

1. A computing system, comprising:
   a controller operable to manage an array of data storage devices, the controller having at least one channel;
   the at least one channel having an internal connector and an external connector;
   the internal connector operable to conductively couple the at least one channel to a data storage device; and
   a light emitting diode (LED) indicator conductively coupled to the internal connector, the LED indicator disposed adjacent the external connector and operable to signal that a data storage device is coupled to the internal connector.

2. The system of claim 1, wherein the controller comprises a RAID controller.

3. The system of claim 1, wherein the internal connector comprises a small computer system interface connector.

4. The system of claim 1, wherein the internal connector comprises a small computer system interface connector having a plurality of pins.

5. The system of claim 4, further comprising a test circuit coupled to a specific pin of the small computer system interface connector.

6. The system of claim 5, wherein the small computer system interface connector has sixty-eight pins and the specific pin is a pin to ground.

7. The system of claim 5, further comprising a power source operable to cause current to flow through the test circuit.

8. The system of claim 7, wherein the power source comprises a battery.

9. A method for indicating channel availability of a RAID controller having at least one channel with an internal connector and an external connector, comprising:
   conductively coupling a test circuit to the internal connector of the at least one channel of the RAID controller;
   using the test circuit to determine whether the internal connector is conductively coupled to a data storage device;
   disposing a light emitting diode (LED) indicator adjacent to the external connector, the LED indicator conductively coupled to the internal connector and the test circuit; and
   illuminating the LED indicator to signal that a data storage device is coupled to the internal connector.

10. The method of claim 9, further comprising:
    identifying a ground pin within the internal connector designated as pin to ground; and
    coupling the test circuit to the ground pin.

11. The method of claim 9, further comprising depressing a test button to initiate the step of using the test circuit to determine whether the internal connector is conductively coupled to a data storage device.

12. The method of claim 9, further comprising the step of coupling an external data storage device to the external connector if the LED indicator indicates that the internal connector is not conductively coupled to a data storage device.

13. The method of claim 9, further comprising:
    identifying a ground pin within the internal connector that is designated as pin to ground;
    coupling the test circuit to the ground pin;
    depressing a test button to expose the test circuit to a power source;

failing to pass electricity through the test circuit if the ground pin is not conductively coupled to the data storage device; and indicating channel availability by failing to illuminate the light emitting diode.

14. The method of claim 9, further comprising:

identifying a ground pin designated as pin to ground within the internal connector;

coupling the test circuit to the ground pin;

depressing a test button to expose the test circuit to a power source;

passing electricity through the test circuit if the ground pin is conductively coupled to the data storage device; and illuminating the light emitting diode with the electricity to indicate unavailability of the channel.

15. The method of claim 14, further comprising depressing a second test button to expose a second test circuit associated with a second channel to a power source after determining identifying the unavailability of the channel.

16. A method for indicating availability of a RAID controller channel having an internal connector and an external connector, comprising:

grounding a specific pin of the internal connector by coupling the internal channel connector to a data storage device;

attempting to induce current flow through a test circuit conductively coupled to the specified pin; and initiating an unavailable signal for the RAID controller channel if current does not flow through the test circuit, the unavailable signal indicated by a light emitting diode (LED) disposed adjacent the external connector.

17. The method of claim 16, further initiating an unavailable signal for the RAID controller channel if current does flow through the test circuit by not illuminating the LED.

18. The method of claim 17, further comprising:

attempting to induce current flow through a second test circuit conductively coupled to a second specified pin included in a second internal connector of a second RAID controller channel.

19. A rack mounted computer system, comprising:

at least one server having a RAID array and a RAID controller;

the RAID controller having at least one channel;

the at least one channel having an internal SCSI connector and an external SCSI connector;

the internal SCSI connector having a plurality of pins with a specific pin designated pin to ground;

a test circuit coupled to the specific pin, the test circuit having a light emitting diode; and the light emitting diode disposed adjacent the external SCSI connector and operable to emit light if a data storage device is coupled to the internal SCSI connector.

* * * * *